(12) United States Patent
Valfridsson et al.

(10) Patent No.: US 8,634,605 B2
(45) Date of Patent: Jan. 21, 2014

(54) SEQUENTIAL IMAGE ALIGNMENT

(75) Inventors: Krister Valfridsson, Lund (SE); Björn Nordin, Genarp (SE)

(73) Assignee: Precise Biometrics AB, Lund (SE)

( * ) Notice: Subject to any disclaimer, the term of this patent is extended or adjusted under 35 U.S.C. 154(b) by 592 days.

(21) Appl. No.: 12/599,185

(22) PCT Filed: May 13, 2008

(86) PCT No.: PCT/EP2008/055813
§ 371 (c)(1),
(2), (4) Date: Apr. 8, 2011

(87) PCT Pub. No.: WO2008/138921
PCT Pub. Date: Nov. 20, 2008

(65) Prior Publication Data
US 2011/0182486 A1     Jul. 28, 2011

Related U.S. Application Data

(60) Provisional application No. 60/924,457, filed on May 16, 2007.

(30) Foreign Application Priority Data

May 16, 2007   (EP) .................................... 07108320

(51) Int. Cl.
*G06K 9/00*   (2006.01)
*G06K 9/46*   (2006.01)

(52) U.S. Cl.
USPC ........... 382/124; 382/126; 382/195; 340/5.83

(58) Field of Classification Search
USPC ......... 382/100, 115, 124, 125, 127, 126, 181, 382/224, 228, 276, 278, 209, 212, 286, 288, 382/190, 195, 201, 217, 218, 219, 203, 204, 382/225, 254, 270; 356/71; 340/5.83, 5.8, 340/5.81, 5.82; 250/200, 206, 555, 556, 250/458.1
See application file for complete search history.

(56) References Cited

U.S. PATENT DOCUMENTS

| | | | |
|---|---|---|---|
| 6,333,989 B1 * | 12/2001 | Borza | 382/124 |
| 6,628,813 B2 * | 9/2003 | Scott et al. | 382/124 |
| 7,197,168 B2 | 3/2007 | Russo | |
| 7,212,658 B2 * | 5/2007 | Du et al. | 382/124 |
| 7,227,978 B2 * | 6/2007 | Komatsuzaki et al. | 382/124 |
| 7,599,529 B2 * | 10/2009 | Fujii | 382/124 |
| 7,706,581 B2 * | 4/2010 | Drews et al. | 382/124 |
| 7,853,054 B2 * | 12/2010 | Biswas et al. | 382/124 |
| 7,961,913 B2 * | 6/2011 | Andersson | 382/115 |
| 8,045,767 B2 * | 10/2011 | Du et al. | 382/124 |
| 2005/0100196 A1 | 5/2005 | Scott et al. | |

FOREIGN PATENT DOCUMENTS

| | | |
|---|---|---|
| JP | 2005-531935 | 10/2005 |
| WO | WO 03/007127 | 1/2003 |
| WO | WO 2005/015481 | 2/2005 |

* cited by examiner

*Primary Examiner* — Sheela Chawan
(74) *Attorney, Agent, or Firm* — Merchant & Gould P.C.

(57) ABSTRACT

A method for reading fingerprints is disclosed. The method comprises acquiring images of a fingerprint from a finger upon relative movement between the finger and an image sensor; selecting lines from said acquired images representing a new area of said fingerprint; determining composition parameters for each selected line; and storing said composition parameters and said selected lines such that a composite image comprising said selected lines is composabte. A corresponding fingerprint reading apparatus, a device, and a computer program are also disclosed.

26 Claims, 5 Drawing Sheets

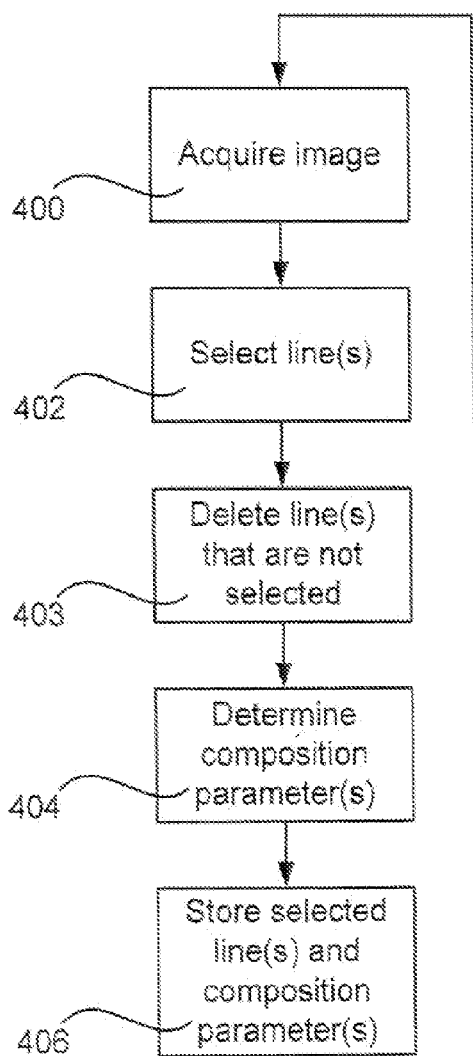
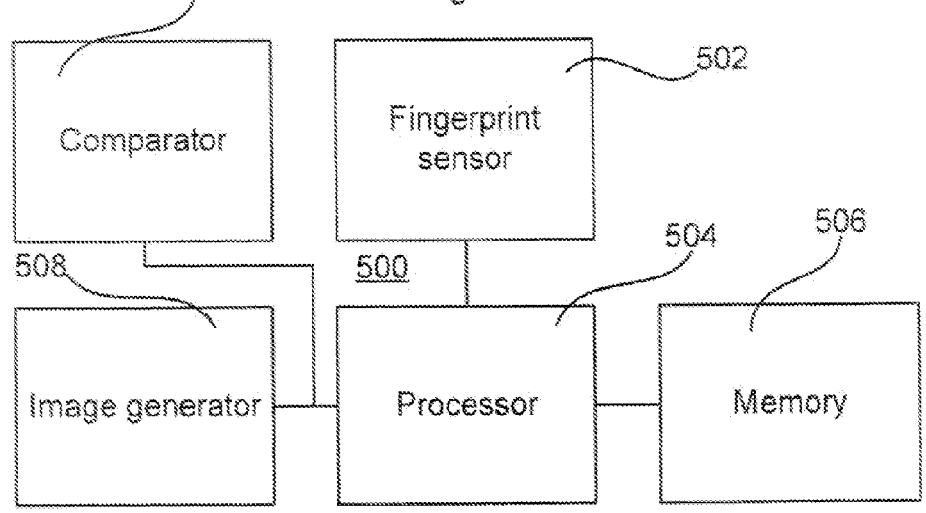

SEQUENTIAL IMAGE ALIGNMENT

This application is a National Stage Application of PCT/EP2008/055813, filed 13 May 2008, which claims benefit of Serial No. 07108320.8, filed 16 May 2007 in Europe and U.S. Ser. No. 60/924,457, filed 16 May 2007 and which applications are incorporated herein by reference. To the extent appropriate, a claim of priority is made to each of the above disclosed applications.

TECHNICAL FIELD

The present invention relates to a method, a fingerprint reading apparatus, a device, and a computer program.

BACKGROUND OF THE INVENTION

It has been known from time immemorial that fingerprints can be used to identify people. Initially fingerprints were taken manually by inking the first joint of a finger and pressing this onto a sheet of paper. A pattern of lines was thus printed onto the sheet of paper, where the lines corresponded to the ridges and the spaces between the lines corresponded to the grooves in the skin of the finger. Now fingerprints are taken using sensors that detect the pattern on the skin on the part of the finger that is held against the sensor.

Traditionally, fingerprint technology has been used primarily for the identification of criminals, but in recent years it has also begun to be used for access control.

Known access control systems are based on a person who is to be given access to something, recording his fingerprint under secure conditions. The recorded fingerprint is stored in a memory, for example a database or on a personal data carrier.

When the access control is to be carried out, the person places his finger on a sensor which records a current fingerprint. This recorded current fingerprint is compared with the previously recorded fingerprint or fingerprints that are in the memory, in order to check whether the recorded current fingerprint is the same as this previously recorded fingerprint or any one of these previously recorded fingerprints and accordingly belongs to an approved person. If so, the system sends a signal indicating that such is the case. The signal can control the access to, for example, premises, a computer or information, as applicable.

Checking whether a current recorded fingerprint is the same as a previously recorded fingerprint is carried out using hardware or software and on the basis of digital representations of the fingerprints. The fingerprint must be represented at high resolution, as only small details distinguish different fingerprints from each other. This means that there is a large amount of information that must be stored for each fingerprint, and also that there is a lot of information that has to be compared in order to determine whether two fingerprints originate from the same person.

One way of reducing the amount of information that is stored and compared is to utilise "feature extraction". According to this, the fingerprint is recorded from the person who is to be granted access to whatever is protected by the system, special features in the fingerprint are sought, such as points where the ridges divide and points where the ridges end, and the positions of these features are determined. Only the position information and the categorisation of the features is stored in the system's memory. When a person's authorisation is to be checked this person's fingerprint is recorded again and then a check is made whether the same features recur in the same places in the current recorded fingerprint as in the previously stored fingerprint.

The sensors that are used in fingerprint systems are based on various detection techniques. There are optical sensors, which essentially comprise a transparent surface, against which the user holds his finger, a lens system and the sensor proper which has a light-sensitive surface. The lens system projects a reduced image of the fingerprint onto the sensor. Optical sensors have the disadvantage of being unwieldy in design, on account or the lens system.

There are also so-called silicon sensors, where the user's finger is in direct contact with the active surface of the sensor. At present the most common silicon sensors are capacitive. They have a sensor surface of at least 100 mm$^2$. The capacitive silicon sensors are relatively expensive as they require a large silicon area.

In addition, there is provided so called swipe sensors. When a fingerprint is to be read, the user passes his finger over the sensor which records, at a high frequency and using e.g. capacitive detection, "images" of the part of the finger that is over the sensor at that moment. The "images" are thereafter put together into a single "image" of the whole fingerprint. The whole image is thereafter compared in the normal way with a previously recorded image. This sensor requires a smaller silicon area than the sensors that record a whole fingerprint from a finger that is held still.

A problem with swipe sensors is to efficiently use the plurality of images acquired by the sensor for checking of the fingerprint.

SUMMARY OF THE INVENTION

In view of the above, an objective of the invention is to solve or at least reduce the problems discussed above. In particular, an objective is to provide an efficient way of using the plurality of images in sense of memory consumption.

The present invention is based on the understanding that images of the plurality of images acquired, when considering neighbouring images in an acquisition sequence, will overlap, and thus provide redundant information. The inventors has realized that extraction of desired data from the plurality of images during acquisition can be done in a simple, and thus memory efficient way, by only storing a limited set of image data, comprising image lines from the acquired images, together with information on composition parameters, e.g. offset of the image lines.

According to a first aspect of the present invention, there is provided a method comprising acquireing images of a fingerprint from a finger upon relative movement between the finger and an image sensor; selecting lines from said acquired images representing a new area of said fingerprint; determining composition parameters for each selected line; and storing said composition parameters and said selected lines such that a composite image comprising said selected lines is composable.

Thereby, a composite image is composable from the reduced information that is stored.

In this context, a line is considered as a part of an image, the part having the size of essentially the width of the sensor used for acquisition, and heigth of a single pixel, or alternatively a predetermined heigth of a few pixels.

Here, a line representing a new area of said fingerprint is a line representing a fingerprint area that is not represented by any of the previously selected lines, i.e. new area counted in a direction perpendicular to an elongation of the lines.

The composition parameters may comprise an offset value for each selected line. The offset is preferably considered in a direction parallel to an elongation of the lines. The offset value will enable aligning of the selected lines.

The method may further comprise deleting image lines of said acquired images that is not selected for said composite image. Alternatively, the method may further comprise enabling overwriting of image lines of said acquired images that is not selected for said composite image. This will ensure that storage capacity is not used for redundant image data.

The method may further comprise forming a sub-image comprising a set of said selected lines when said selected lines reach a predetermined amount; comparing said sub-image with a reference image; and deleting said lines of said set after said comparison is performed. The forming of said sub-image may be based on said stored composition parameters and said set and may comprise aligning said lines of said set in accordance with said composition parameters. The comparing may comprise extracting features from said sub-image; and comparing said extracted features with features of said reference image. The features may comprise minutiae or frequency information of the fingerprint. The use of sub-images will enable a further reduced storage requirement, since sub-images are processed, i.e. composed and compared, during acquisition, and can then be deleted.

The method may further comprise forming said composite image when all images are acquired; and comparing said composite image with a reference image. The forming of said composite image may be based on said stored composition parameters and said selected lines and may comprise aligning said lines of said set in accordance with said composition parameters. The comparing may comprise extracting features from said composite image; and comparing said extracted features with features of said reference image. The features may comprise any data that makes the fingerprint distinguishable from other fingerprints. The features may for example comprise any of minutiae or frequency information of the fingerprint. The frequency information may be a pure frequency transformation of the image, or parts of the image. The frequency information may be spectral components, such as frequency, direction, and/or phase. As further examples, the extracted features may be based on Gabor values in different directions, skeleton data, and/or binarised images. The extracted features may be represented by a feature code that is easily comparable with corresponding stored feature codes.

Selecting a line of said lines may comprise selecting at least a first acquired line representing said new area of said fingerprint.

Selecting to line of said lines may comprise averaging at least two acquired lines representing said new area of said fingerprint, and determining an average of said acquired lines to be said selected line.

Selecting a line of said lines may comprise determining one of at least two acquired lines representing a new area of said fingerprint best representing said new area, and selecting said one acquired line best representing said new area to be said selected line.

The relative movement between the finger and the image sensor may be enabled in any direction. This will provide for alternative positioning of the image sensor while maintaining feasible user interaction for a person using the image sensor.

According to a second aspect of the present invention, there is provided a fingerprint reading apparatus comprising a sensor arranged to acquire images of a fingerprint from a finger upon relative movement between the finger and said image sensor; a processor arranged to select, from said acquired images, lines representing a new area of said fingerprint such that a composite image is composable, and the processor is further arranged to determine composition parameters for each selected line; and a memory arranged to store said composition parameters and said selected lines.

A line representing a new area of said fingerprint is a line that is still not represented by the selected lines, i.e. new area counted in a direction perpendicular to an elongation of the lines.

The composition parameters may comprise an offset value for each selected line.

The processor may be arranged to provide a control signal causing deletion of image lines of said acquired images that is not selected for said composite it stage. Alternatively, the processor is arranged to enable overwriting of image lines of said acquired images that is not selected or said composite image.

The apparatus may further comprise a sub-image generator arranged to form a sub-image comprising a set of said selected lines when said selected lines reach a predetermined amount; and a comparator arranged to compare said sub-image with a reference image, wherein said lines of said set are deletable after said comparison is performed.

The stored composition parameters and said lines of said set may be input to said sub-image generator such that said sub-image generator is able to align said lines in accordance with said composition parameters to form said sub-image.

The comparator may comprise a feature extractor arranged to extract features from said sub-image to be comparable with features of said reference image. The features may comprise minutiae or frequency information of the fingerprint.

The apparatus may further comprise a composite image generator arranged to form a composite image comprising said selected lines when all images are acquired; and a comparator arranged to compare said composite image with a reference image.

The stored composition parameters and said lines of said set may be input to said composite image generator such that said composite image generator is able to align said selected lines in accordance with said compositor parameters to form said composite image.

The comparator may comprise a feature extractor arranged to extract features from said composite image to be comparable with features of said reference image. The features may comprise minutiae or frequency information of the fingerprint.

At least one of said selected lines may be each first acquired line representing said new area of said fingerprint.

At least one of said selected lines may comprise an average of at least two acquired lines representing said new area of said fingerprint.

At least one of said selected lines may comprises one of at least two acquired lines determined to represent said new area of said fingerprint and determined to best represent said new area of said at least two lines.

According to a third aspect of the present invention, there is provided a device comprising an apparatus according to the second aspect of the present invention, said device being any of a group comprising: a door lock, a personal computer, a mobile phone, a personal digital assistant, a vehicle, a weapon, a toy, a smart card, a ticket, and a portable memory device.

According to a fourth aspect of the present invention, there is provided a computer program comprising program code means adapted to perform any actions of the method according to the first aspect of the present invention when the program is run on a processor. The computer program may be stored on a computer readable medium.

The definition of terms and the advantages of the second to fourth aspect of the present invention are similar to those demonstrated for the first aspect of the present invention.

Generally, all terms used in the claims are to be interpreted according to the ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

Other objectives, features and advantages of the present invention will appear from the following detailed disclosure, from the attached dependent claims as well as from the drawings.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 4 is a flow chart illustrating a method according to an embodiment of the present invention;

FIG. 5 schematically illustrates a fingerprint reading apparatus according to an embodiment of the present invention;

DETAILED DESCRIPTION OF PREFERRED EMBODIMENTS

Figure 1:
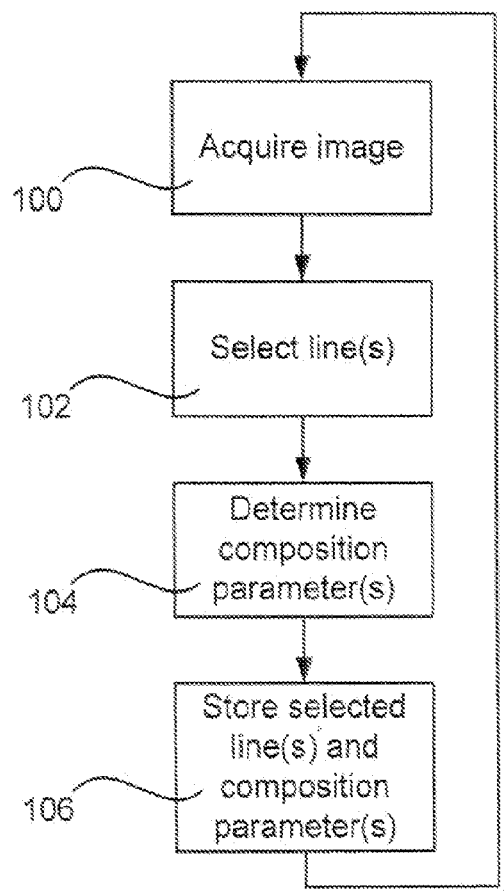
FIG. 1 is a flow chart illustrating a method according to an embodiment of the present invention.

FIG. 1 is a flow chart illustrating a method according to an embodiment of the present invention. An image of a fingerprint is acquired in an image acquireing step 100. The image is acquired upon a relative movement between an image sensor and the finger to be imaged, e.g. by sweeping the finger over the sensor, while several images are acquired in sequence.

The sensor is preferably a swipe sensor, which has an elongated sensor area to which the relative movement of the finger is performed in a direction perpendicular to the elongation of the sensor. Normally, the width of the sensor is about the width of a normal fingertip, while the size of the sensor in the movement direction only is one or a few millimeters. Thereby, each acquired image comprises a part of the fingerprint.

Depending on the relative movement, the overlap between the sequentially acquired images may differ, and depending on direction and straightness of the relative movement, the alignment between the sequentially acquired images may differ. However, by image processing, these issues can be determined and coped with.

If memory capacity were infinite, there would be no problem storing the acquired images and forming a composite image by image processing in a number of ways. In practice, memory capacity is limited to be able to provide fingerprint acquisition means that is cheap, small, fast, and/or has low power consumption. Therefore, in a line selection step 102, one or more lines from the acquired image are selected. The selected lines represent a new area of the fingerprint, i.e. represent an area that is not represented by any previous selected line. By this selection, only image information that is not redundant is selected. In this context, the term "line" is to be construed as a part of an image, the pad having the size of essentially the width of the sensor used for acquisition, and heigth, i.e., in the relative movement direction, of a single pixel, or alternatively a predetermined heigth of two or a few pixels.

The selected line can be the first acquired line representing the new area, an aggregated line of two or more acquired lines, from different acquired overlapping images, that represent the new area, or a selection of a line from two or more lines, from different acquired overlapping images.

Which of these three approaches that is used can be predetermined as a design parameter, or be any dynamic selection of the approaches performed during the sequential acquisition. For example, if a first acquired line is considered to be satisfactory, e.g. the full width of the line comprises image data that relates to a fingerprint, the first approach is prioritised, but if not, the last approach is tried, e.g. checking if there is any line representing the same area from the neighbouring acquired image that provides satisfactory quality. If none of these approaches gives a satisfactory line, the approach with the aggregated line is applied. The aggregation of the line can comprise averaging of the two or more lines.

For each selected line, composition parameters are determined in a composition parameter determination step 104. The composition parameter can comprise an offset value, i.e. an amount indicating an offset from a normalized position of each image part, i.e. line, in a direction parallel to the elongation of the line. The composition parameters can also comprise brightness, contrast, hue, quality information etc. on the image data of the line.

The selected lines, i.e. the image data of the selected lines, and the composition parameters are stored in a storage step 106. By this storage, a composite image can be formed from the stored image data by using the stored composition data, whenever the composite image is needed.

Figure 2:
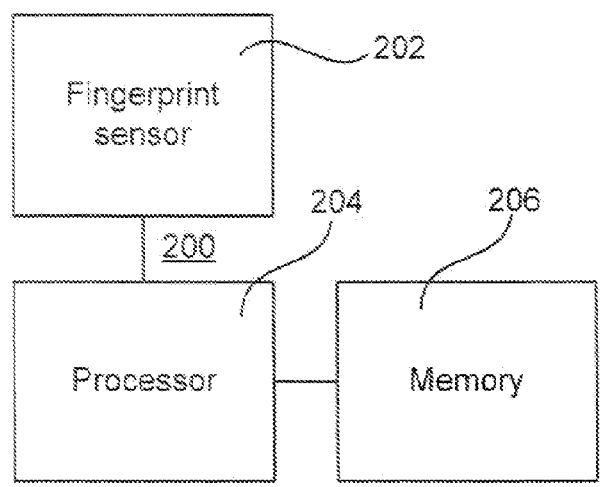
FIG. 2 schematically illustrates a fingerprint reading apparatus according to an embodiment of the present invention.
Figure 3:
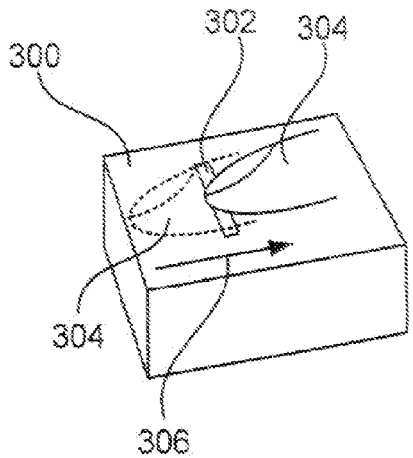
FIG. 3 illustrates a fingerprint reader device according to an embodiment of the present invention.

FIG. 2 schematically illustrates a fingerprint reading apparatus 200 according to an embodiment of the present invention. The finger print reading apparatus comprises a sensor 202 arranged to acquire images of a fingerprint from a finger upon relative movement between the finger and the image sensor, for example as illustrated in FIG. 3, which illustrates a fingerprint reader 300 with a sensor 302 on which a finger 304 is swiped from a first position, as depicted by the dotted finger position, to a second position, as depicted by the solid line finger position in a direction indicated by arrow 306. Alternatively, the finger is kept in a fixed position, and the sensor is moved, or a combination of movement of the finger and the sensor.

It is to be rioted that the invention will work with the relative movement between the finger and the image sensor in any direction. This will provide for alternative positioning of the image sensor while maintaining feasible user interaction for a person using the image sensor. An example is when using an accessory fingerprint reading apparatus, which can be attached to different sides of a device, with which the fingerprint reading apparatus is to be used, depending on positioning of accessory ports etc. of the device. Then, the user is able to pull the finger towards her, which normally is the most natural for the user, independent on which side the accessory fingerprint reading apparatus is attached. Similar examples apply to portable fingerprint reading apparatuses, which may be oriented in any direction. For users who prefer to push the finger over the sensor, or slide it sideways, the invention is also applicable.

Returning to FIG. 2, a processor 204 is arranged to select lines from the acquired images. A line is a part of an acquired image. This part has preferably the size corresponding to the width of the image provided by the sensor, and heigth of a single pixel, or alternatively a predetermined heigth of two or a few pixels. Lines that are selected are preferably lines representing a new area of the fingerprint. Here, a line representing a new area of the fingerprint is a line representing a fingerprint area that is not represented by any of the previously selected lines, i.e. new area counted in a direction perpendicular to an elongation of the lines. Thus, by selecting lines this way, a composite image is composable from these lines. To be able to compose the composite image, the processor 204 is further arranged to determine composition parameters for each selected line. The composition parameters can for example be an offset value, i.e. an amount indicating an offset from a normalized position of each image part, i.e. line, in a direction parallel to the elongation of the line. The composition parameters can also comprise brightness, contrast, hue, quality information etc. on the image data of the line.

The apparatus 200 further comprises a memory 206 arranged to store the composition parameters and the selected lines.

FIG. 4 is a flow chart illustrating a method according to an embodiment of the present invention. An image of a fingerprint is acquired in an image acquireing step 400. The image is acquired upon a relative movement between an image sensor and the finger to be imaged, e.g. by sweeping the finger over the sensor, while several images are acquired in sequence.

In a line selection step 402, one or more lines from the acquired image are selected. The selected lines represent a new area of the fingerprint, i.e. represent an area that is not represented by any previous selected line. By this selection, only image information that is not redundant is selected. The selection is performed in a similar way as demonstrated for the embodiment described with reference to FIG. 1.

In a line deletion step 403, lines that are not selected, i.e. redundant parts of the acquired image, are deleted from wherever they are stored. This will further reduce load on storage capacity.

For each selected line, composition parameters are determined in a composition parameter determination step 404. The composition parameter can comprise an offset value, i.e. an amount indicating an offset from a normalized position of each image part, i.e. line, in a direction parallel to the elongation of the line. The composition parameters can also comprise brightness, contrast, hue, quality information etc. on the image data of the line.

The selected lines, i.e. the image data of the selected lines, and the composition parameters are stored in a storage step 406. By this storage, a composite image can be formed from the stored image data by using the stored composition data, whenever the composite image is needed.

FIG. 5 schematically illustrates a fingerprint reading apparatus 500 according to an embodiment of the present invention. The finger print reading apparatus comprises a sensor 502 arranged to acquire images of a fingerprint from a finger upon relative movement between the finger and the image sensor, for example as illustrated in FIG. 3.

Returning to FIG. 5, a processor 504 is arranged to select lines from the acquired images. Selection of lines is performed in a way similar to what disclosed with reference to FIG. 2. To be able to compose the composite image, the processor 504 is further arranged to determine composition parameters for each selected line. The composition parameters can for example be an offset value, i.e. an amount indicating an offset from a normalized position of each image part, i.e. line, in a direction parallel to the elongation of the line. The composition parameters can also comprise brightness, contrast, hue, quality information etc. on the image data of the line. The selected lines and the composition parameters are stored in a memory 506.

The apparatus 500 further comprises an image generator 508 arranged to generate a composite image from the stored selected lines and composition parameters. The image generator can form a full composite image when all images are acquired, or form a sub-image when enough of lines and composition parameters are stored to form a sub-image of preferred size. The apparatus 500 further comprises a comparator 510 arranged to compare fingerprint image data of the composite image or the sub-image with reference fingerprint image data. The comparison can be based on plain image comparison, or based on extracted features, such as frequency information or minutiae.

Figure 6:
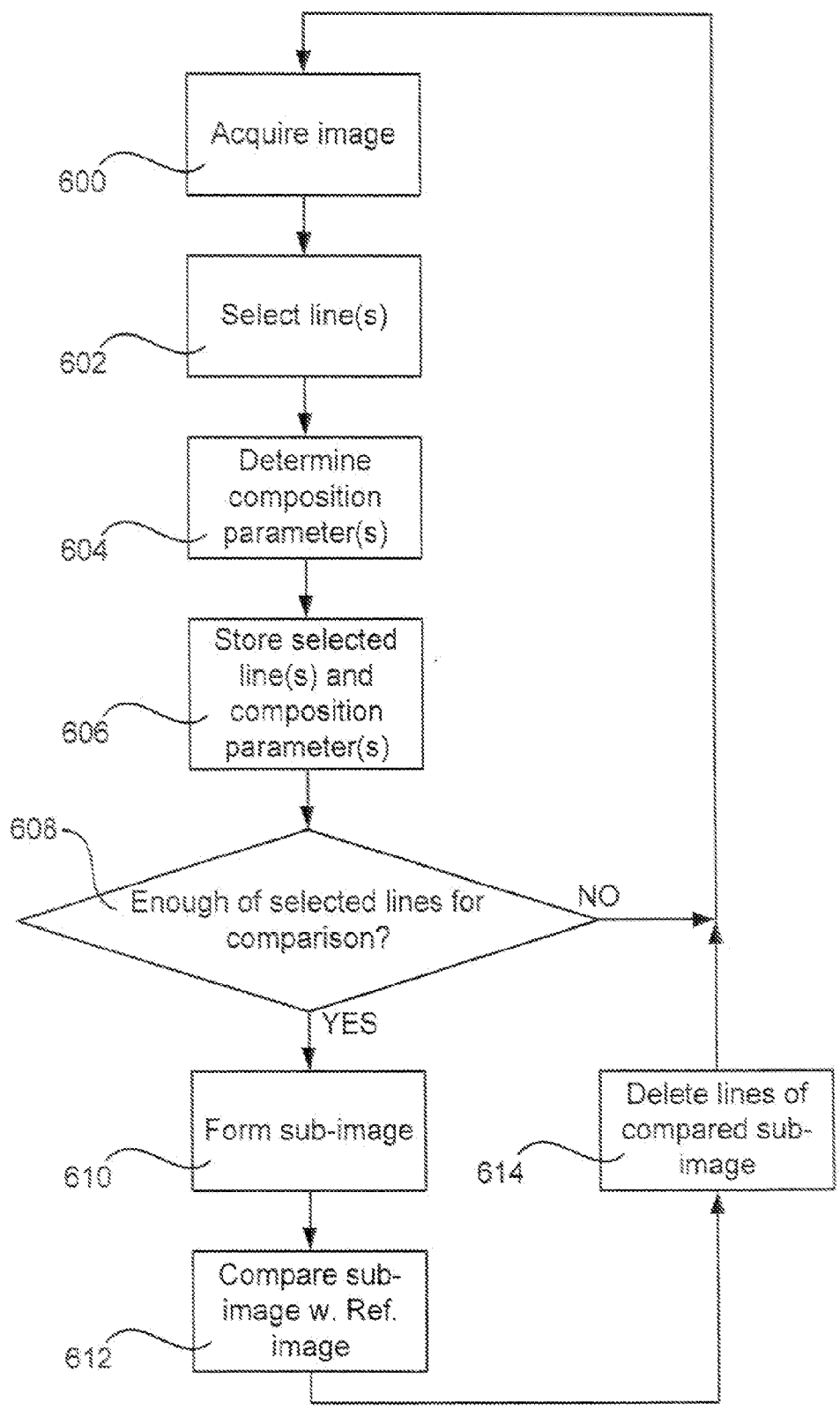
FIG. 6 is a flow chart illustrating a method according to an embodiment of the present invention.

FIG. 6 is to flow chart illustrating a method according to an embodiment of the present invention. An image of a fingerprint is acquired in an image acquireing step 600. The image is acquired upon a relative movement between an image sensor and the finger to be imaged, e.g. by sweeping the finger over the sensor, while several images are acquired in sequence, as described above.

In a line selection step 602, one or more lines from the acquired image are selected. The selected lines represent a new area of the fingerprint, i.e. represent an area that is not represented by any previous selected line. The selected line can be the first acquired line representing the new area, an aggregated line of two or more acquired lines, from different acquired overlapping images, that represent the new area, or a selection of a line from two or more lines, from different acquired overlapping images. Application of these approached can be according to what is described above with reference to FIG. 1.

Optionally, lines that are not elected can be deleted, since they only comprise redundant information.

For each selected line, composition parameters are determined in a composition parameter determination step 604. The composition parameter can comprise an offset value, i.e. an amount indicating an offset from normalized position of each image part, i.e. line, in a direction parallel to the elongation of the line. The composition parameters can also comprise brightness, contrast, hue, quality information etc. on the image data of the line.

The selected lines, i.e. the image data of the selected lines, and the composition parameters are stored in a storage step 606. By this storage, composite image can be formed from the stored image data by using the stored composition data, whenever the composite image is needed.

In a determination step 608, it is determined if enough of lines are selected, and thus stored, to make a partial comparison. This can be done by applying a threshold comprising a predetermined number of lines. If there is not enough lines for a partial comparison, the process returns to the image acquireing step 600 for acquireing further images. On the other hand, if there is enough of lines, the process continues to a sub-image forming step 610, where a sub-image is formed based on the stored selected lines and the corresponding composition parameters. The sub-image is then compared with a reference fingerprint in a sub-image comparison step 612. The comparison can be based on plain image comparison, or based on extracted features, such as frequency information or minutiae. In the latter cases, minutiae extraction or frequency analysis is performed on the formed sub-image, and the minutiae or the frequency information is compared with minutiae or frequency information stored for the reference fingerprint, respectively.

After the comparison, the process returns to the image acquisition step 600 or acquireing further images, if the finger is still in relative movement to the sensor. Optionally, before returning to the image acquisition step 600, the process can perform an optional line deletion step 614, where lines used for forming the sub-image are deleted. This option can further save memory use.

Figure 7:
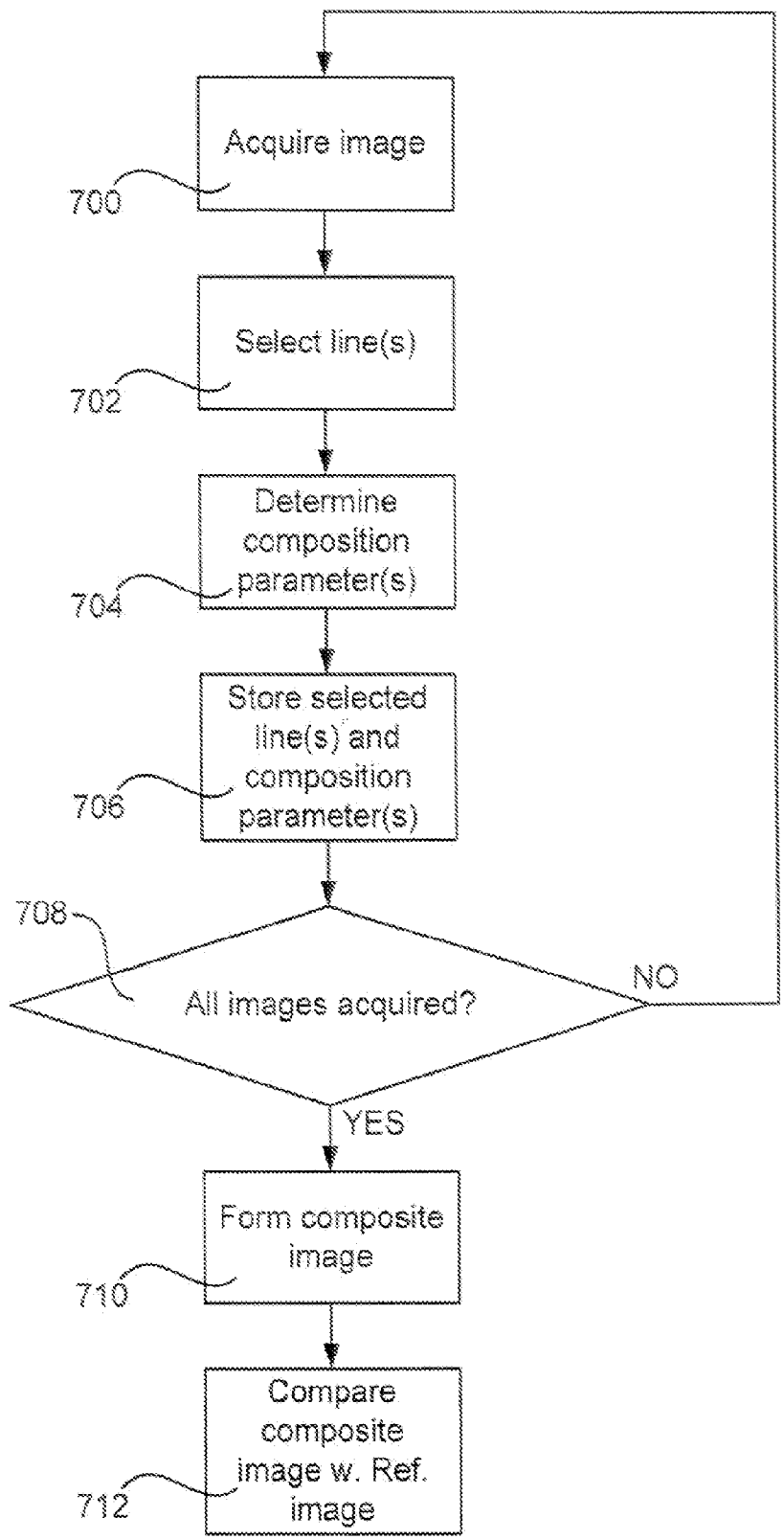
FIG. 7 is a flow chart illustrating a method according to an embodiment of the present invention.

FIG. 7 is a flow chart illustrating a method according to an embodiment of the present invention. An image of a fingerprint is acquired in an image acquireing step 700. The image is acquired upon a relative movement between an image sensor and the finger to be imaged, e.g. by sweeping the finger over the sensor, while several images are acquired in sequence, as described above.

In a line selection step 702, one or more lines from the acquired image are selected. The selected lines represent a new area of the fingerprint, i.e. represent an area that is not represented by any previous selected line. The selected line can be the first acquired line representing the new area, an aggregated line of two or more acquired lines, from different acquired overlapping images that represent the new area, or a selection of a line from two or more lines, from different acquired overlapping images. Application of these approached can be according to what is described above with reference to FIG. 1.

Optionally, lines that are not selected can be deleted, since they only comprise redundant information.

For each selected line, composition parameters are determined in a composition parameter determination step 704. The composition parameter can comprise an offset value, i.e. an amount indicating an offset from a normalized position of each image part, i.e. line, in a direction parallel to the elongation of the line. The composition parameters can also comprise brightness, contrast, hue, quality information etc. on the image data of the line The selected lines, i.e. the image data of the selected lines, and the composition parameters are stored in a storage step 706. By this storage, a composite image can be formed from the stored image data by using the stored composition data, whenever the composite image is needed.

In a determination step 708, it is determined if all images are acquired, or if the finger is still in relative movement to the sensor. If the finger is still in relative move movement to the sensor, the process returns to the image acquisition step 700 for acquireing further images.

if all images of the finger are acquired, or alternatively enough of lines are selected, and thus stored, which can be determined by e.g. applying a threshold comprising a predetermined number of lines, to form a composite image that can be used for comparison, the process continues to a composite image forming step 710, where a composite image is fumed based on the stored selected lines and the corresponding composition parameters. The composite image is then compared with a reference fingerprint in a composite image comparison step 712. The comparison can be based on plain image comparison, or based on extracted features, such as frequency information or minutiae. In the latter cases, minutiae extraction or frequency analysis is performed on the formed composite image, and the minutiae or the frequency information is compared with minutiae or frequency information stored for the reference fingerprint, respectively.

Figure 8:
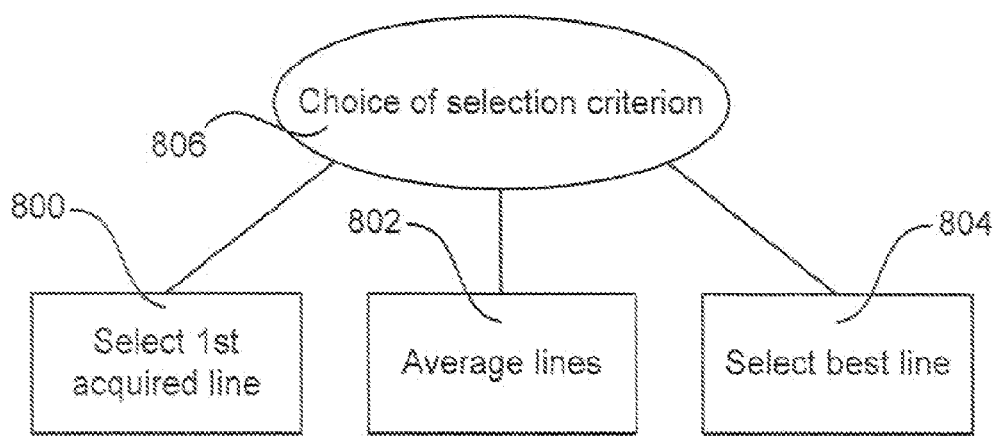
FIG. 8 is a schematical illustration of selection criterions for selecting lines.

FIG. 8 is a schematical illustration of selection criterions for selecting the lines discussed above with reference to any of FIGS. 1 to 7. The selected line can be a first acquired line representing the new area, as represented by a first acquired line selection approach 800. The selected line can be an aggregated line of two a more acquired lines, wherein the two or more acquired lines come from different acquired overlapping images, that represent the new area, as represented by an aggregated line approach 802. The aggregation of the line can comprise averaging at the two or more lines, or an aggregation of selected parts of the lines to be aggregated, wherein the parts are picked based on their respective determined image quality. The selected line can be a selection of a line from two or more lines, from different acquired overlapping images, as represented by best line selection approach 804, wherein a line providing the best image quality of the two or more lines is selected.

Which of these three approaches 800, 802, 804 that is used can be predetermined as a design parameter when designing a fingerprint reacting apparatus. The selection of approach can be a dynamic selection by a criterion selection mechanism 806 of the approaches performed during the sequential acquisition. The criterion selection mechanism can select among two or more of the approaches 800, 802, 804 based on a criterion selection rule. For example, the criterion selection rule can comprise that if a first acquired line is considered to be satisfactory, e.g. the full width in the line comprises image data that relates to a fingerprint, the first approach is prioritised, but if not, the last approach is tried, e.g. checking if there is any line representing the same area from the neighbouring acquired image that provides satisfactory quality. If none of these approaches gives a satisfactory line, the approach with the aggregated line is applied. Other criterion selection rules can be applied to provide appropriate selection of lines.

Figure 9:
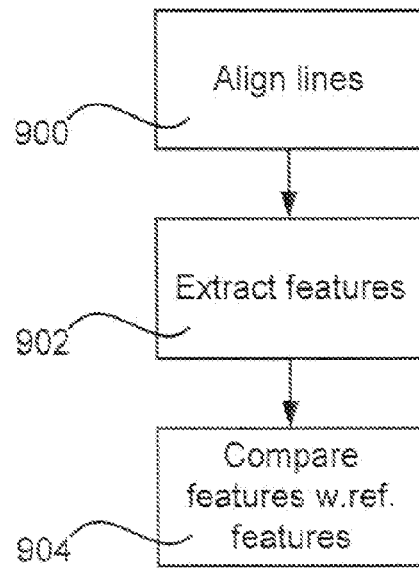
FIG. 9 is a flow chart illustrating a procedure, according to an embodiment of the invention, for forming and comparing a fingerprint that is acquired.

FIG. 9 is a flow chart illustrating a procedure, according to an embodiment of the invention, for forming and comparing as fingerprint that is acquired according to any of the embodiments disclosed above with reference to FIGS. 1 to 8. In a line alignment step 900, selected and stored lines are aligned to form a composite image of the fingerprint or a part of the fingerprint. From the composite image, features are extracted in a feature extraction step 902. The features can comprise minutiae together with positions, pairs of minutiae with relative positions, or groups of minutiae with relative positions. Minutiae can comprise information on type, and/or direction, and positions can be defined by a chartesian or a polar representation. Relative positions can be represented by distance and/or direction. The features can comprise frequency information on the composite image. The frequency information can be provided for the entire image, or for a number of parts of the image, which the image is divided into.

The extracted features are compared with stored features of a fingerprint, a so called template, to which the acquired fingerprint for example is to be authenticated against. At least a part of the comparison and the storage of the template are preferably performed in a secure processing and storage means, such as a smart card or secured part of a personal processing device, such as a personal computer, a personal digital assistant, or a mobile telephone.

Figure 10:
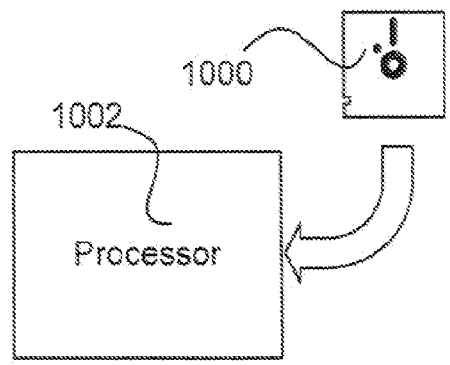
FIG. 10 schematically illustrates a computer readable medium comprising a computer program to be executed by a processor.

FIG. 10 schematically illustrates a computer readable medium 1000 comprising a computer program to be executed by a processor 1002. The method according to any of the embodiments of the present invention is suitable for computer implementation. A computer program comprising program code means adapted to perform any of the actions of the disclosed methods when the program is run on a processor 1000 can be stored on a computer readable medium 1002. The computer program can also be distributed as a signal.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method comprising:
    acquiring images of a fingerprint from a finger upon relative movement between the finger and an image sensor;
    selecting lines from said acquired images representing a new area of said fingerprint;
    determining composition parameters for each selected line;
    storing said composition parameters and said selected lines such that a composite image comprising said selected lines is composable, wherein said composition parameters comprises an offset value for each selected line;
    forming a sub-image comprising a set of said selected lines when said selected lines reach a predetermined amount;
    comparing said sub-image with a reference image; and
    deleting said lines of said set after said comparison is performed.

2. The method according to claim 1, further comprising deleting image lines of said acquired images that is not selected for said composite image.

3. The method according to claim 1, further comprising enabling overwriting of image lines of said acquired images that is not selected for said composite image.

4. The method according to claim 1, wherein said forming of said sub-image is based on said stored composition parameters and said set and comprises aligning said lines of said set in accordance with said composition parameters.

5. The method according to claim 1, wherein said comparing comprises extracting features from said sub-image; and comparing said extracted features with features of said reference image.

6. The method according to claim 1, further comprising forming said composite image when all images are acquired; and comparing said composite image with a reference image.

7. The method according to claim 6, wherein said forming of said composite image is based on said stored composition parameters and said selected lines and comprises aligning said lines of said set in accordance with said composition parameters.

8. The method according to claim 6, wherein said comparing comprises extracting features from said composite image; and comparing said extracted features with features of said reference image.

9. The method according to claim 1, wherein selecting a line of said lines comprises selecting at least a first acquired line representing said new area of said fingerprint.

10. The method according to claim 1, wherein selecting a line of said lines comprises averaging at least two acquired lines representing said new area of said fingerprint, and determining an average of said lines to be said selected line.

11. The method according to claim 1, wherein selecting a line of said lines comprises determining one of at least two acquired lines representing said new area of said fingerprint best representing said new area, and selecting said one acquired line best representing said new area to be said selected line.

12. The method according to claim 1, wherein said relative movement between the finger and the image sensor is enabled in any direction.

13. A computer program embodied on a non-transitory computer-readable medium comprising program code means adapted to perform any actions of claim 1 when the program is run on a processor.

14. A fingerprint reading apparatus comprising:
    a sensor arranged to acquire images of a fingerprint from a finger upon relative movement between the finger and said image sensor;
    a processor arranged to select, from said acquired images, lines representing a new area of said fingerprint such that a composite image is composable, and the processor is further arranged to determine composition parameters for each selected line;
    a memory arranged to store said composition parameters and said selected lines, wherein said composition parameters comprises an offset value for each selected line;
    a sub-image generator arranged to form a sub-image comprising a set of said selected lines when said selected lines reach a predetermined amount; and
    a comparator arranged to compare said sub-image with a reference image, wherein said lines of said set are deletable after said comparison is performed.

15. The apparatus according to claim 14, wherein said processor is arranged to provide a control signal causing deletion of image lines of said acquired images that is not selected for said composite image.

16. The apparatus according to claim 14, wherein said processor is arranged to enable overwriting of image lines of said acquired images that is not selected for said composite image.

17. The apparatus according to claim 14, wherein said stored composition parameters and said lines of said set is input to said sub-image generator such that said sub-image generator is able to align said lines in accordance with said composition parameters to form said sub-image.

18. The apparatus according to claim 14, wherein said comparator comprises a feature extractor arranged to extract features from said sub-image to be comparable with features of said reference image.

19. The apparatus according to claim 14, further comprising a composite image generator arranged to form a composite image comprising said selected lines when all images are acquired; a comparator arranged to compare said composite image with a reference image.

20. The apparatus according to claim 19, wherein said stored composition parameters and said lines of said set is input to said composite image generator such that said composite image generator is able to align said selected lines in accordance with said composition parameters to form said composite image.

21. The apparatus according to claim 19, wherein said comparator comprises a feature extractor arranged to extract features from said composite image to be comparable with features of said reference image.

22. The apparatus according to claim 14, wherein at least one of said selected lines are each first acquired line representing a new area of said fingerprint.

23. The apparatus according to claim 14, wherein at least one of said selected lines comprises an average of at least two acquired lines representing a new area of said fingerprint.

24. The apparatus according to claim 14, wherein at least one of said selected lines comprises one of at least two acquired lines determined to represent a new area of said fingerprint and determined to best represent said new area of said at least two lines.

25. The apparatus according to claim 14, wherein said relative movement between the finger and the image sensor is enabled in any direction.

26. A device comprising an apparatus according to claim 14, said device being any of a group comprising: a door lock, a personal computer, a mobile phone, a personal digital assistant, a vehicle, a weapon, a toy, a smart card, a ticket, and a portable memory device.

* * * * *